Jan. 15, 1929.  H. N. COX  1,699,226
LENS SYSTEM FOR COLOR PHOTOGRAPHY
Filed June 13, 1927   3 Sheets-Sheet 1
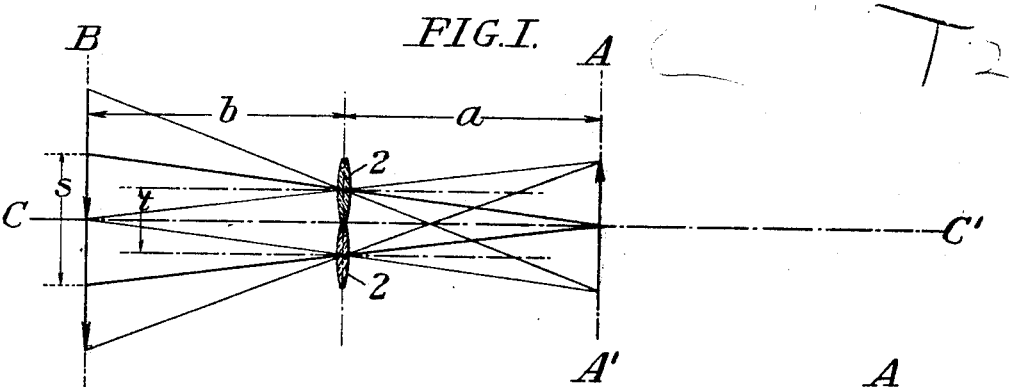
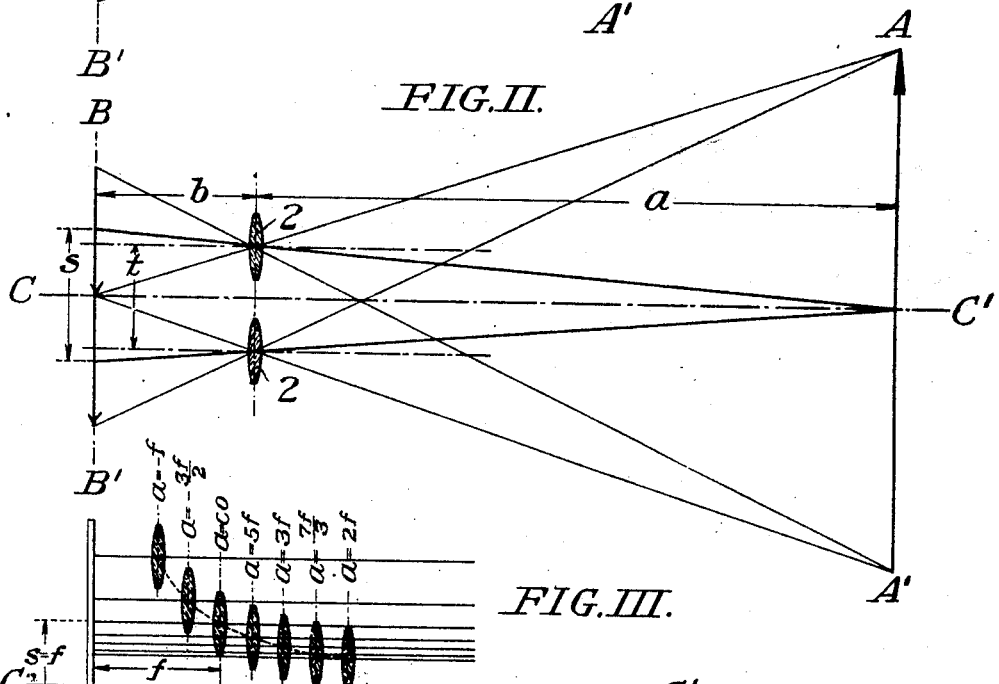
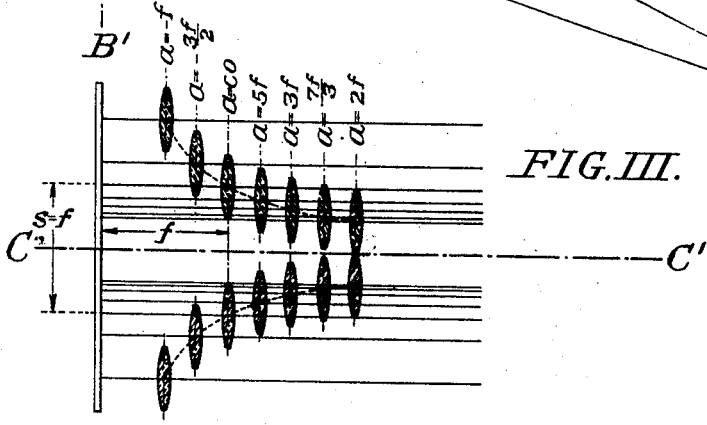
INVENTOR
Harold N. Cox
by Christy and Christy
his attorneys Jan. 15, 1929.
H. N. COX
1,699,226
LENS SYSTEM FOR COLOR PHOTOGRAPHY
Filed June 13, 1927   3 Sheets-Sheet 2
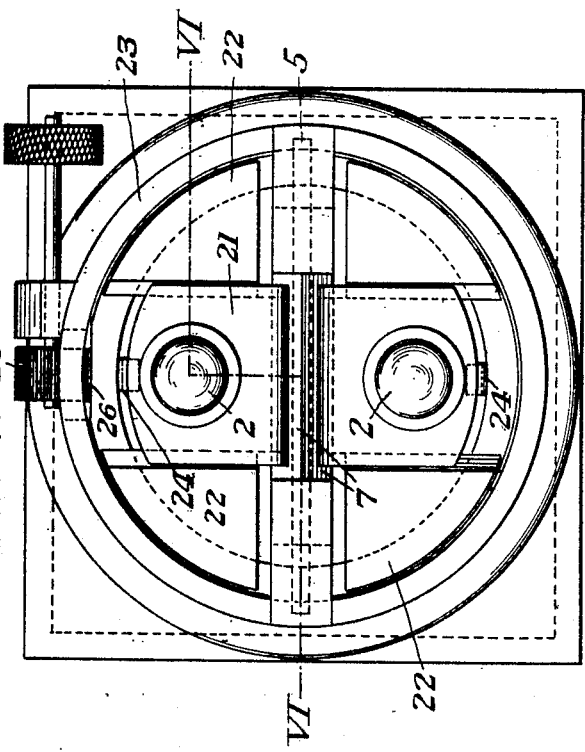
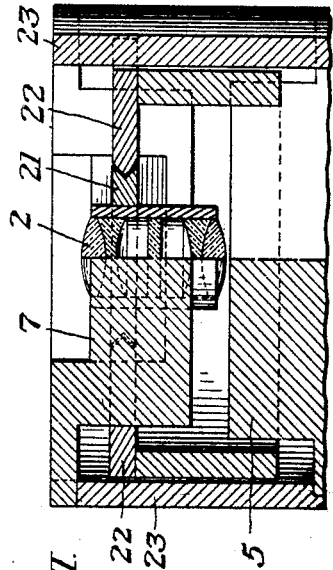
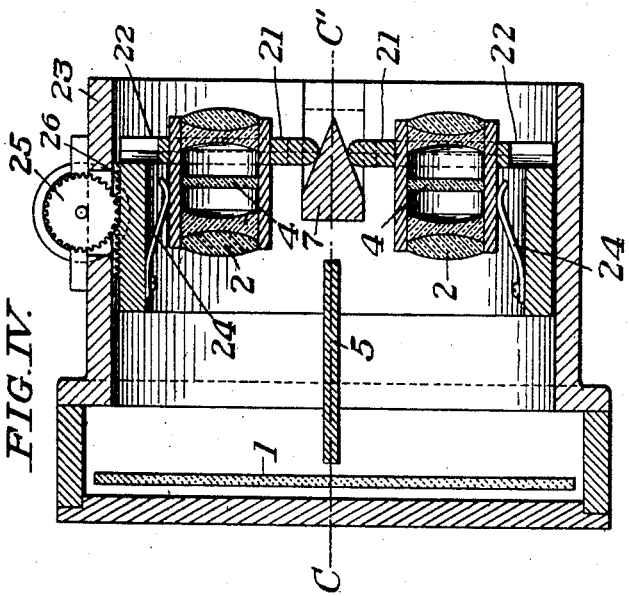
INVENTOR
Harold N. Cox
by Christy and Christy
his attorneys Jan. 15, 1929.
H. N. COX
1,699,226
LENS SYSTEM FOR COLOR PHOTOGRAPHY
Filed June 13, 1927    3 Sheets-Sheet 3
FIG. VII.
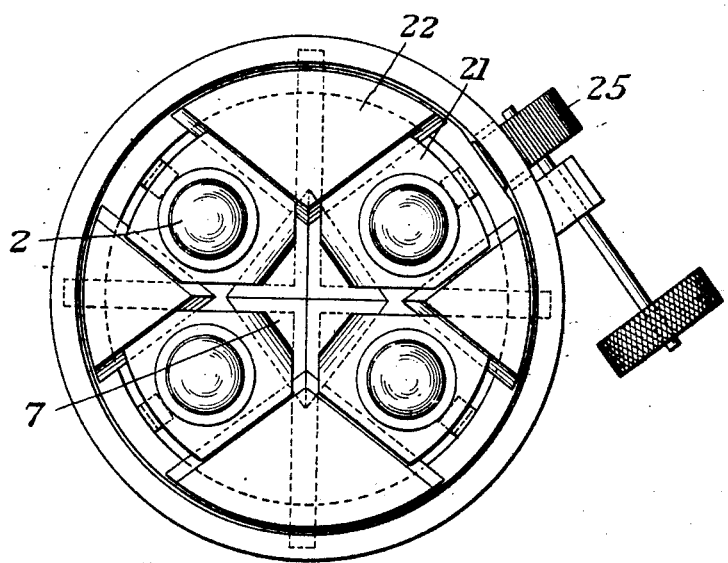
FIG. VIII.
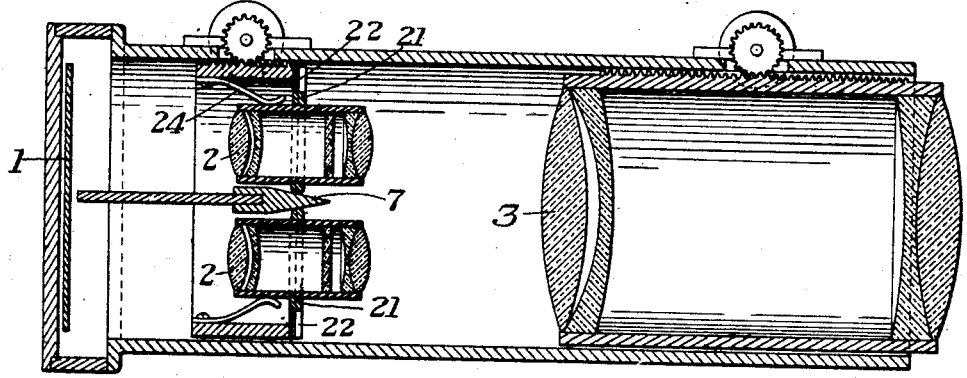
INVENTOR
Harold N. Cox
by Christy and Christy
his attorneys Patented Jan. 15, 1929.

1,699,226

UNITED STATES PATENT OFFICE.

HAROLD N. COX, OF GLEN RIDGE, NEW JERSEY, ASSIGNOR TO COX MULTI-COLOR PHOTO COMPANY, OF PITTSBURGH, PENNSYLVANIA, A CORPORATION OF DELAWARE.

LENS SYSTEM FOR COLOR PHOTOGRAPHY.

Application filed June 13, 1927. Serial No. 198,341.

My invention relates to improvements in lens systems used in color photography. The lens system of my invention is applicable both in the camera used for taking the photograph and in the projector used for throwing the photograph upon a screen. It is applicable to apparatus for the taking and for the projecting either of still pictures or of motion pictures. The object in view is the maintenance of proper spacing and consequently accurate registry upon the screen where ultimately the picture is displayed, of the plurality of pictures projected to and from the film. Under the general term "film" I here include both the sensitive film of the camera and the film which in the projector carries the picture. Such registry may be maintained without the use of auxiliary objectives or prisms.

The invention is illustrated in the accompanying drawings. Figs. I and II are diagrams showing the relative positions of object (or screen), lens, and film. Fig. III is a diagram showing the relative positions of two lenses as their distance from the film changes in focusing. Figs. IV, V, and VI are views in axial section, in front elevation, and in section on the plane VI—VI, Fig. V, of a camera embodying my invention. Fig. VII is a view in front elevation comparable with Fig. V, and illustrating variability in the number of component lenses. Fig. VIII is a view in axial section of a camera in which also the invention is embodied and which illustrates variations in detail from the showing of Figs. IV-VI.

Referring first to Figs. I and II, A—A' is the object plane (or screen plane); B—B' is the image plane (or film); 2, 2 are the lenses of the multiple objective; C—C' is the axis of the instrument, from which the lenses are equidistantly spaced; $a$ indicates the distance between lens and object plane; $b$, the distance between lens and image plane; $s$ the space interval in the image plane between coresponding points of the multiple images; $t$ is the distance between the optical centers of the lenses, measured in the same plane as is $s$.

Comparing Figs. I and II, it will be seen that the object plane A—A' is in Fig. II more remote from the instrument than in Fig. I, and that in consequence the spacing of the lenses 2 both one from another and from the image plane have been altered. And it will be perceived that while the space between lens and image plane has been changed, in order to maintain sharpness of definition in plane B—B' (or, with projector in mind, in the plane A—A'), the change in spacing between the lenses has been such that in both positions the optical center of each lens lies in straight lines connecting conjugate points in object and in image. Taking the focal length of the lens as $f$, the equation here may be stated as follows:

Since
$$\frac{t}{s} = \frac{a}{a+b}$$

and
$$b = \frac{af}{a-f}$$

$$t = \frac{sa}{a+b} = \frac{s(a-f)}{a} = \frac{fs}{b}$$

The equation, therefore, of the curve in which the optical center of the lens moves as focusing is effected is $$t = \frac{fs}{b}$$

In Fig. III this curve is plotted. In this particular instance (Fig. III) $s=f$.

Turning from the diagrams to Figs. IV–VI which illustrate a camera in which the invention is embodied, the lenses 2, 2 are shown to be mounted in plates 21, 21, and these plates are mounted to move radially with respect to axis C—C' between guides 22, 22. The plates 21, 21 are at their inner ends engaged by a block 7 whose position is fixed with respect to the image plane, in which plane extends the film 1. The drawings show the block 7 to be mounted in the walls of the tube 23 which is rigidly borne by the camera. The plates 21 are held yieldingly to bearing engagement upon block 7 by means of springs 24. Focusing movement of the lenses 2 is effected by means of a pinion 25 rotatably mounted in the tube 23 and engaging a rack 26 upon a framework of which the guides 22 are part. The plate-engaging faces of block 7 are symmetrically shaped, and are so particularly shaped that as the lenses are shifted to and fro the film they are spread and drawn together; and always, in every position, they maintain their desired spacing.

For minute accuracy the plate-engaging surfaces of block 7 should be so minutely shaped that the optical centers of the lenses 2 will follow the path expressed by the equation $$t = \frac{fs}{b}$$

but, within the range and under the conditions which obtain in commercial photography, I have found it sufficient to determine with care the extreme positions in the range of movement and to provide for a straight-line path between such positions. The error in intermediate positions I have found to be negligible.

The lenses 2 may be and ordinarily will be elaborated, as Fig. IV indicates. Each lens 2 is provided with a color filter 4, and it will be understood that the colors of the filters of the several lenses are different, as is familiar in color photography. The camera of Figs. IV–VI additionally includes a screen 5 which segregates to each lens 2 its appropriate film area, and by the screen 5 the camera is indeed converted into a plurality of cameras in coordinated assembly.

The number of lenses 2 and accordingly the number of coordinated cameras may be such as desired. In the camera of Figs. IV–VI the number is two; in that of Fig. VII, there are four. It will be understood in applying to the lens assembly of Fig. VII the formulæ given above, the space interval between the optical centers of the lenses will be measured on the diameter of the circle in which the optical centers lie, a circle which centers in the axis C—C'.

In Fig. VIII, the lens system includes, in combination with the plural lens parts 2, a lens part 3 common to the plurality of lens parts 2. It will be perceived that precisely by such means as those described for controlling and defining the movement of the lenses 2 of the cameras of Figs. IV–VII, the movement of the lens parts 2 of the lens system shown in Fig. VIII may be controlled and defined, and angle of view varied.

The lens system illustrated in Fig. VIII possesses a capacity for correcting and overcoming a certain practical difficulty. It is found in practice that the film employed in picture taking and picture projecting may vary from time to time in its actual dimensions. The positive film used in the projecting machine may, for instance, during its life of service vary in a range amounting to one and one half per cent. In single image projection that of course is a matter of no moment, but when the superposition of multiple images is to be accomplished, any such variation manifestly will tend to give imperfect register and blurring of edges. In the relative adjustability of the lens elements one to another, there is the capacity for correction of errors due to varying dimension in the film, and in the focusing device for lens part 3 there is the capacity for effecting registration of the images of the lens elements when those elements have been brought to particular positions of relative adjustment.

In Figs. IV–VIII I have shown the invention, generically described with reference to Figs. I–III, in specific application to a camera; manifestly it is equally applicable to a projector, and manifestly identically the same means may be employed and the same lens movement obtained, for achieving generically the same result; the result, namely, of sharpness of definition as between a screen (or object) and a film, whether the printed film used in the projector or the sensitized film used in the camera.

I claim as my invention:

In apparatus for color photography, a film, a carrier, a plurality of lenses having parallel axes and movably mounted in said carrier, means for adjusting the said lenses in their relative spacing in the said carrier in a direction normal to their axes, a second carrier, a lens borne by said second carrier and cooperating simultaneously with the plurality of lenses aforesaid, and independent means for adjusting the said second carrier in a direction normal to the plane of the film.

In testimony whereof I have hereunto set my hand.

HAROLD N. COX.